Patented June 17, 1952

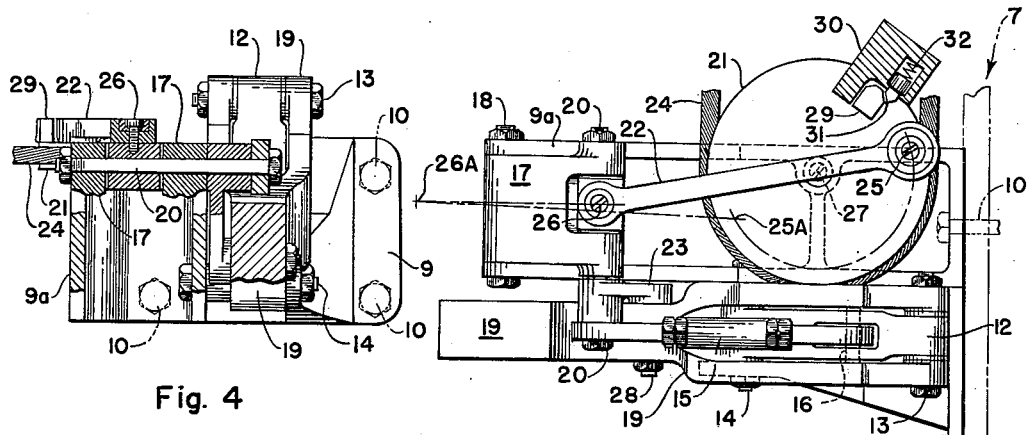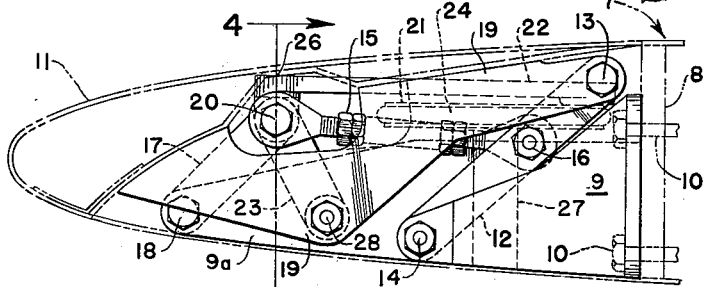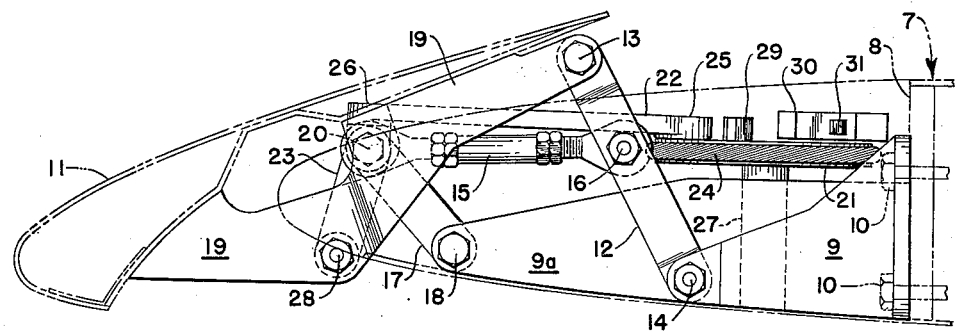

2,600,527

UNITED STATES PATENT OFFICE 2,600,527

WING SLAT OPERATING MECHANISM

Carroll G. Gordon, Pasadena, Calif., assignor to North American Aviation, Inc.

Application September 14, 1949, Serial No. 115,701

12 Claims. (Cl. 244—42)

The present invention relates generally to aircraft wings provided with movable components and more particularly to improvements in mounting, supporting and operating mechanisms for slot-forming flaps, slats and vane elements associated with the wings of aircraft.

Aircraft wings are normally provided with trailing edge flaps for increasing and improving the lift and drag characteristics of the wings for landing and take-off conditions. Such wings frequently are provided with leading edge or nose slats which are operable either automatically, or at the will of the pilot, to create a leading edge slot as the slat is moved into a beneficial aerodynamic position to thereby prevent or delay stalling of the wing. In high speed aircraft approaching the speed of sound the loads over the wing leading edge become very high and accordingly the loads upon an operating system for a leading edge slat imposes severe requirements upon its arrangement and operation. Such nose slats are also subjected to severe oscillation and vibration in their retracted positions during high Mach number flight and particularly under unstable airflow conditions.

The present invention relates to an improved arrangement of the slat operating linkage and associated mechanism in relationship to the relatively fixed wing and provides a relatively light, yet unusually strong, support for a leading edge slat under the severe conditions of subsonic and transonic flight. The improved linkage of the present invention accomplishes both the bodily translation and rotation of the leading edge slat or vane into the desired aerodynamic position to prevent stalling of the wing. While accomplishing the positioning of the slat into its extended position the linkage is entirely shrouded behind the slat and is entirely enclosed within the wing contour when the slat is in the closed or retracted position, as distinguished from the drag-producing exposed parts in the prior devices. The arrangement of the linkage in the improved mechanism is also such that the maximum loads imposed in the mechanism are approximately the same as, or very little more than, the applied load to the hinge. A further improvement of the present mechanism resides in its irreversibility and in the provision of a simple lock and stop in the retracted position to prevent movement resulting from oscillation or vibration of the slat and the wing structure during high Mach number flight or under unstable airflow conditions.

It is, accordingly, a major object of the present invention to provide an improved mounting and operating mechanism for a wing leading edge slat. It is a further object to provide a wing slat operating mechanism which is relatively light, yet rugged and sturdy, in construction and which is capable of accomplishing both bodily translation and rotation of the slat, or other section of the wing leading edge, into the optimum aerodynamic position to prevent stalling of the wing. It is a further object of this invention to provide a slat operating and supporting linkage which is entirely enclosed within the wing contour when the slat is in its closed or retracted position, and which is completely shrouded in its extended position.

A further object resides in the arrangement of a wing slat mechanism wherein the maximum loads imposed in the mechanism are substantially the same or very little more than the applied load to the hinge. It is a further object to provide an operating mechanism for a wing slat suitable for use in high speed aircraft approaching the speed of sound and such mechanism as will withstand the high loads over the wing leading edge in such aircraft without the operating mechanism becoming unduly complicated and heavy.

It is a still further object to provide an improved wing slat operating mechanism which is irreversible in its retracted position and is provided with an improved limit stop and latching arrangement such that an aerodynamic load from the slat cannot move the same from the surface of the main wing. It is a further object to provide at the same time an arrangement whereby a relatively small cable load or pilot force can rotate the operating link past its dead center for the opening of the slat when desired. A further object of the present invention resides in the improved arrangements of the respective elements of the mounting and operating mechanism and their relationship to the relatively fixed wing.

Other objects and advantages of the present invention will become apparent to those skilled in the art after reading the present description taken in conjunction with the accompanying drawings, forming a part hereof, in which:

Fig. 1 is a sectional elevational view of the leading edge of an aircraft wing showing a nose slat mounted thereon by a form of the improved slat operating mechanism;

Fig. 2 is a similar elevational view showing the slat in its extended position;

Fig. 3 is a plan view of the slat operating mechanism of Fig. 1 in its retracted position; and Fig. 4 is a sectional view of the nose slat operating mechanism as taken along the lines 4—4 of Fig. 1, looking rearwardly.

Referring now to Figs. 1, 2 and 3, the numeral 7 indicates the relatively fixed portion of an aircraft wing leading edge portion having a front spart 8. To the forward portion of the spar 8 there is attached bracket structures 9 and 9a by means of the bolts or other attachments 10. A leading edge slat or nose vane 11 is shown in its retracted position in Fig. 1 in which it completes the nose portion of the profile of the airfoil or wing 7 and is shown in its extended position in Fig. 2 in which it creates a slot between the slat 11 and the fixed leading edge of the airfoil 7. The slat 11 is attached at its rear portion by the rear link 12 at the upper pivotal connection 13, the link 12 in turn being pivotally supported at the lower pivot 14 carried on the forward portion of the bracket 9. A further interconnecting link 15, of a tubular push-pull type having adjustable terminal portions, is pivotally connected to the pivot 16 at an intermediate portion of the link 12. A front link 17 is pivotally mounted at its lower terminal at the pivot 18 upon the forward extremity of the extended bracket portion 9a, the link 17 being pivotally connected at its upper portion to the outer terminal of the push-pull link 15 at the common pivot 20. It will be noted that the rear and front links 12 and 17 are inclined upwardly and rearwardly from their fixed pivots in the retracted position of the slat 11 as shown in Fig. 1 in a substantially parallel relationship, and that the lower terminal of each link is pivotally mounted upon the fixed axes of the respective pivots 14 and 18, which are spaced in the chordwise direction.

The slat 11 has fixedly attached to the back face thereof the slat attaching link support member 19. This link support member is pivotally attached at its trailing portion to the link 12 by the abovementioned upper pivot 13 and is similarly pivotally connected by means of the short floating link 23 pivotally connected by the pivot 28 at a more forward and lower portion of the link support 19. The upper terminal of the link 23 is also pivotally mounted upon the common pivot 20 at the upper terminal of the front link 17 and the outer terminal of the push-pull interconnecting link 15. It will accordingly be noted that the slat 11 through its link support member 19 is pivotally supported at the upper terminal of the rear link 12 and is swingingly supported by means of the floating suspension link 23 from the common pivot at the upper terminal of the forward shorter link 17. The relationship of the axes of the fixed pivots 14 and 18 and the moving pivots 13, 20 and 28, as further determined by the location of the pivot 16, and the lengths of the several links, is such that the slat 11 is translated bodily forwardly and also rotated in the counterclockwise direction as it is projected forwardly, the free pivot 20 moving from its retracted position aft of the pvot 18 to its extended position forward of the pivot 18.

The slat 11 is extended and retracted by the rotation of the sheave or quadrant 21 pivotally connected to the operating link 22, the forward terminal of which is pivotally connected to the aforementioned common swinging pivot 20. The sheave 21 is rotated by means of the control cable 24 suitably connected to control means located within the cockpit of the airplane accessible to the pilot, or to automatic or other suitable means for its operation. The sheave 21 is pivotally connected to the operating link 22 by the pivot 25, the link 22 being pivotally connected to the swinging pivot 20 by means of the universal pivotal connection 26. The sheave 21 is shown in Fig. 3 in the retracted position of the slat 11, being mounted upon the vertical axis of the pivot 27, and rotatable by pull on the cable 24 into the position in which the pivot 25 occupies the position indicated at 25A, at which point the forward pivotal connection 26 is moved forwardly to the position indicated at 26A. In the latter position, the forward link 17 occupies the position shown in Fig. 2 in which the slat has been moved into its forward slot-opening operative position.

The sheave 21 is provided with an upwardly projecting lug or stop element 29 in the rotative path of which is disposed the fixed detent block 30 in which is mounted the detent pin 31 having suitably beveled faces, and which pin is resiliently urged into its locking or latching position by the spring 32. The faces of the stop or lug 29 are similarly beveled such that as the sheave 21 is rotated in the counterclockwise direction as viewed in Fig. 3, and into the retracted position of the slat 11, the axis of the pin 25 passes slightly beyond the dead-center line extending through the axes of the pivots 26 and 27 and as this slight "beyond dead-center" position is reached, the lug 29 which has already depressed the detent pin 31 against the opposition of the spring 32, is stopped and the quadrant or sheave 21 is prevented from further rotation in the counterclockwise direction by engagement of the lug 29 with the detent block 30. The operating mechanism is, accordingly, made irreversible in this retracted position such that a compression force developed within the link 12 which might result in a lift force upon the slat, or from another cause, would result in a relatively small moment about the pivot axis 27 of the sheave 21, which moment would be easily resisted by the spring-opposed detent pin 31. Accordingly, in the event of failure of the operating mechanism the slat 11 would be positively locked in the retracted positon. However, when it is desired to again extend the slat, a relatively small cable load, or pilot force, rotates the operating link 22 past dead-center and the slat can be readily opened.

It will, accordingly, be noted that the disclosed linkage both translates and rotates the slat into the desired aerodynamic position to prevent stalling of the wing. While accomplishing this objective, the linkage is entirely enclosed within the contour of the wing 7 when the slat 11 is in the closed or retracted position and the maximum loads imposed in the mechanism are relatively little more than the applied load to the hinge. This is accomplished by the use of the simple link 12 attached as at 13 to the trailing edge of the slat 11 with the fixed pivot 14 so located that the trailing edge of the slat is moved to the desired position. The load on the link 12 is accordingly relatively low because the main support of the slat is disposed near the center of pressure of the slat. The link 15 is attached at the pivot 16 at a suitable radius upon the link 12 giving the required rotation to the short link 17 near the leading edge of the basic wing profile. This small front link 17, in rotating about the fixed pivot 18 in the basic wing structure, provides a moving center for the main slat suspension link 23. As the pivotal connection of the latter is at a fixed distance from the first mentioned pivotal connection to the link 12 attached near the slat trailing edge, the main slat link support member 19 is forced to move about the moving common center 20 and to translate the main slat support point a greater distance than could be accomplished by a simple link within the airfoil contour.

The improved mechanism of the present invention is not limited to the nose slat disclosed but may be adapted to advantage to the operation of slot forming elements at the trailing edge of the wing as well. While but one operating assembly has been shown and described it will be understood that more than one may be utilized on the same slat or that other mountings of a given slat may utilize the supporting linkage only without a second actuating portion of the assembly.

Other forms and modifications of the present invention both with respect to its general arrangement and the individual parts, which may occur to those skilled in the art after reading the foregoing description are intended to come within the scope and spirit of the present invention as more particularly set forth in the appended claims.

I claim:

1. In aircraft wing construction, a relatively fixed wing, a slat movably supported from the leading edge of said wing, a first link pivotally connected at an upper terminal to a trailing portion of said slat, said first link pivotally connected at its lower portion to said fixed wing, a second link disposed forward of said first link having its lower terminal pivotally connected to said fixed wing, a forwardly extending interconnecting link pivotally connected at its aft portion to an intermediate portion of said first link and at its forward portion to the upper terminal of said second forward link, means for supporting said slat from the pivotal connection between said second forward link and said interconnecting link at said pivotal connection and actuating means operatively connected to said pivotal connection for rotating said first and said second links about their fixed pivot axes for projecting said slat bodily forwardly and rotationally downwardly from said fixed wing.

2. In an aircraft wing, a slat movably supported from the leading edge of said wing, a pair of chordwise spaced links each pivotally connected at their respective lower portions to chordwise spaced pivots on said wing, the rearmost of said links pivotally connected at an upper portion to a trailing portion of said slat, an interconnecting link pivotally connected to an intermediate portion of said rearmost link and to an upper portion of said forward link at a pivotal connection, means for pivotally supporting said slat from said pivotal connection, an actuating element operatively mounted upon said wing, a push-pull element pivotally mounted upon said actuating element and pivotally connected to said pivotal connection and means for operating said actuating element for the forward translation of said slat with respect to said wing leading edge.

3. In a wing slat operating mechanism, a relatively fixed wing, a slat supported from the leading edge of said wing, a rear link pivotally connected at a lower portion upon said wing and pivotally connected at an upper portion to said slat, a forward link pivotally connected at a lower portion to said wing and having a pivotal connection carried at an upper portion, an interconnecting link pivotally connected to an intermediate portion of said rear link and to said pivotal connection, said front and rear links extending upwardly and rearwardly in substantially parallel relationship in the retracted position of said slat, suspension link means pivotally connected at an upper portion to said pivotal connection and pivotally connected at a lower portion to said slat, and actuating means operatively connected to said pivotal connection for rotating the same forwardly above said fixed pivot of said forward link and for causing said suspension link means to be bodily translated forwardly from its retracted position at the rear of said forward fixed pivot to an extended position forward of said forward fixed pivot in which said slat has been both translated and rotated forwardly and downwardly away from the leading edge of said wing.

4. In aircraft wing construction, a relatively fixed wing, a slat element carried by the leading edge of said fixed wing, a rear link pivotally connected at a lower portion to said fixed wing and pivotally connected at its upper portion to a rear portion of said slat, a forward link of relatively shorter length than said rear link pivotally connected at its lower portion to said fixed wing, an interconnecting link pivotally connected to an intermediate portion of said rear link and connected to an upper portion of said forward link at a pivotal connection, a slat mounting link pivotally connected at an upper portion to said pivotal connection and pivotally connected at a lower portion to said slat at a point forward of and lower than the said pivotal connection of said rear link to said slat, and actuating means for simultaneously rotating said forward and rear interconnected links arranged in such manner that said slat rear pivotal mounting is rotated about the fixed pivot of said rear link and said slat forward pivotal mounting is rotated forwardly about both said fixed pivot of said forward link and about the said pivotal connection between said forward link, said interconnecting link and said slat mounting link for the concurrent translation and rotation of said slat.

5. In an aircraft wing having a forward leading edge portion and a rearward trailing portion, a slat movably carried by the leading edge portion of said wing, a rear link pivotally mounted at a lower terminal of said link upon said wing, a forward link pivotally mounted at a lower terminal of said forward link upon said wing, said slat pivotally connected to an upper terminal of said rear link, an interconnecting link pivotally connecting an upper terminal of said front link with the midportion of said rear link, a floating suspension link pivotally suspended from the interconnection of said front link with said interconnecting link and carrying at its lower portion a pivotal connection to said slat, and reciprocating actuating means operatively connected to said pivotal interconnection between said front link, said interconnecting link and said floating suspension link for swinging said pivotal interconnection about the axis of the lower pivotal connection of said front link for extending said slat with a forward translatory and rotary movement into its operative position.

6. In an aircraft wing, a slot-forming slat movably supported from the leading edge of said wing, a swingable link pivotally supported at a lower portion upon said wing and pivotally connected at an upper portion to said slat, a second link pivotally supported at a lower portion upon said wing at a point spaced forward of said swingable link pivot, said second link having a pivotal connection at its upper portion to the forward portion of a third substantially horizontal link, said third link having a pivotal connection at a rear portion to an intermediate portion of said swingable link, a fourth link pivotally connected at one terminal to said slat and pivotally at an opposite terminal to the pivotal connection between said second and third links, and means for rotating said links about their respective pivotal supports upon said wing arranged in such manner that said slat is moved forwardly and downwardly from a retracted to an extended operative position and each of said links is disposed within the airfoil profile of said wing in said retracted position.

7. The combination with an aircraft wing, of a slat movably supported from the leading edge portion of said wing, a pair of swingable links separately pivoted at their lower terminals to chordwise spaced pivots upon said wing, said slat being pivotally connected to the upper terminal of the rearmost of said swingable links, means interconnecting said swingable links for causing them to swing concurrently, and link means having one terminal pivotally connected to said slat and an opposite terminal pivotally connected to the pivotal connection between said forward swingable link and said interconnecting means for imparting translation and rotation to said slat as said swingable links are rotated about their fixed pivotal connections to said wing.

8. In an aircraft wing, a slat movably carried by the leading edge portion of said wing, a rear link having upper and lower terminals, said rear link pivotally mounted at its lower terminal upon said wing, a forward link having upper and lower terminals, said forward link pivotally mounted at its lower terminal upon said wing, the said slat being pivotally connected to the upper terminal of said rear link, an interconnecting link pivotally connected to the upper terminal of said forward link and to the mid-portion of said rear link, and a slat supporting link having upper and lower portions, said supporting link pivotally connected at its upper portion to the interconnection of said forward link with said interconnecting link, and said supporting link pivotally connected to said slat at the lower portion of said link.

9. In an aircraft wing, a slot-forming slat movably supported from the leading edge of said wing, a first link pivotally supported at a lower portion of said link upon said wing and pivotally connected at an upper portion of said link to a trailing portion of said slat, a second link pivotally supported at a lower portion upon said wing at a point spaced forward of the pivotal connection of said first link to said wing, a third substantially horizontal link having a pivotal connection to an intermediate portion of said first link, said second link having a pivotal connection at its upper portion to a forward portion of said third link, a fourth link pivotally connected at a lower portion to said slat and pivotally connected to said pivotal connection at the upper portion of said second link and the forward portion of said third link, and means for rotating said first and second links about their respective pivotal supports upon said wing arranged in such manner that said slat is moved forwardly and downwardly from a retracted position to an extended operative position in which an upwardly and rearwardly extending slot is formed between said slat and said wing.

10. In an aircraft wing, a slat movably supported from the leading edge of said wing, a first link pivotally supported at a lower portion of said link upon said wing and pivotally connected at an upper portion of said link to a trailing portion of said slat, a second link pivotally supported at a lower portion upon said wing at a point spaced forward of the pivotal connection of said first link to said wing, said second link being appreciably shorter than said first link, a third substantially horizontal link having a pivotal connection to an intermediate portion of said first link, said second link having a pivotal connection at its upper portion to a forward portion of said third link, a fourth link pivotally connected at a lower portion to said slat and pivotally connected to said pivotal connection at the upper portion of said second link and the forward portion of said third link, and means for rotating said first and second links about their respective pivotal supports upon said wing arranged in such manner that as said slat is moved forwardly from a retracted position it is also rotated by the difference in length of said first and second links.

11. In an aircraft wing having leading edge and trailing portions, a slat movably carried by the leading edge portion of said wing, a rear link having upper and lower terminals, said rear link pivotally mounted at its lower terminal upon said wing and at its upper terminal upon said slat, a forward link having upper and lower terminals, said forward link pivotally mounted at its lower terminal upon said wing, a fore and aft extending interconnecting link pivotally connected at its aft portion to an intermediate portion of said rear link and pivotally connected at its forward portion to the upper terminal of said forward link, the said pivotal connections of said rear and forward links to said wing and the pivotal connections at the fore and aft portions of said interconnecting link forming an upwardly and rearwardly sloping parallelogram in the retracted position of said slat, a supporting link pivotally connected at its lower portion to a depending portion of said slat, said supporting link pivotally connected at an upper portion to the pivotal connection at the upper portion of said forward link and to the forward portion of said interconnecting link, means for extending said parallelogram linkage forwardly into an extended operative position of said slat in which the pivotal connection to its trailing portion is raised and the pivotal connection to said supporting link is moved forward of the pivotal connection of said forward link to said wing in such manner that said slat is rotated as it is translated forwardly.

12. In an aircraft wing having leading edge and trailing portions, a slot-forming slat movably carried by the leading edge portion of said wing, a rear link having upper and lower terminals, said rear link pivotally mounted at its lower terminal upon said wing and at its upper terminal upon said slat, a forward link having upper and lower terminals, said forward link pivotally mounted at its lower terminal upon said wing, a fore and aft extending interconnecting link pivotally connected at its aft portion to an intermediate portion of said rear link and pivotally connected at its forward portion to the upper terminal of said forward link, the said pivotal connections of said rear and forward links to said wing and the pivotal connections at the fore and aft portions of said interconnecting link forming an upwardly and rearwardly sloping parallelogram in the retracted position of said slat, a supporting link pivotally connected at its lower portion to a forward portion of said slat, said supporting link pivotally connected at an upper portion to the pivotal connection at the upper portion of said forward link and to the forward portion of said interconnecting link, means including an actuating element rotatable on an axis normal to the axes of said pivotal connections, and a link pivotally connected to said actuating element and pivotally connected to said parallelogram linkage for extending said parallelogram linkage forwardly into an operative position of said slat in which the pivotal connection to its trailing portion is raised and the pivotal connection to said supporting link is moved forward of the pivotal connection of said forward link to said wing in such manner that a slot is formed between said slat and the leading edge portion of said wing as said slat is forwardly translated and rotated into its operative position.

CARROLL G. GORDON.

REFERENCES CITED

The following references are of record in the file of this patent:

UNITED STATES PATENTS

| Number | Name | Date |
| --- | --- | --- |
| 1,837,132 | Page | Dec. 15, 1931 |
| 2,065,684 | Gaines | Dec. 29, 1932 |